United States Patent
Chiu et al.

(10) Patent No.: US 9,105,398 B2
(45) Date of Patent: Aug. 11, 2015

(54) METHOD OF MANUFACTURING A STACKED-TYPE SOLID ELECTROLYTIC CAPACITOR PACKAGE STRUCTURE HAVING A PLURALITY OF NEGATIVE LEAD PINS

(71) Applicant: APAQ TECHNOLOGY CO., LTD., Miaoli County (TW)

(72) Inventors: Chi-Hao Chiu, Hsinchu (TW); Kun-Huang Chang, Hsinchu (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 14/591,130

(22) Filed: Jan. 7, 2015

(65) Prior Publication Data

US 2015/0121672 A1 May 7, 2015

Related U.S. Application Data

(62) Division of application No. 13/620,591, filed on Sep. 14, 2012, now abandoned.

(51) Int. Cl.
 *H01G 9/00* (2006.01)

(52) U.S. Cl.
 CPC .................................. *H01G 9/0032* (2013.01)

(58) Field of Classification Search
 None
 See application file for complete search history.

(56) References Cited

U.S. PATENT DOCUMENTS

2014/0071589 A1* 3/2014 Lin et al. ...................... 361/523

* cited by examiner

*Primary Examiner* — Seahvosh Nikmanesh
(74) *Attorney, Agent, or Firm* — Li & Cai Intellectual Property (USA) Office

(57) ABSTRACT

A stacked-type solid electrolytic capacitor package structure includes a capacitor unit, a package unit and a conductive unit. The conductive unit includes a plurality of stacked-type capacitors stacked on top of one another and electrically connected with each other, and each stacked-type capacitor has a positive portion and a negative portion. The package unit includes a package body for enclosing the capacitor unit. The conductive unit includes a first conductive terminal and a second conductive terminal. The first conductive terminal has a first embedded portion electrically connected to the positive portion and enclosed by the package body and a first lateral exposed portion connected to the first embedded portion. The second conductive terminal has a second lateral exposed portion, a second front exposed portion, a second rear exposed portion, and a second embedded portion electrically connected to the negative portion and enclosed by the package body.

5 Claims, 6 Drawing Sheets

METHOD OF MANUFACTURING A STACKED-TYPE SOLID ELECTROLYTIC CAPACITOR PACKAGE STRUCTURE HAVING A PLURALITY OF NEGATIVE LEAD PINS

CROSS REFERENCE TO RELATED APPLICATION

This application is a divisional application of U.S. application Ser. No. 13/620,591, filed on Sep. 14, 2012, and entitled "STACKED-TYPE SOLID ELECTROLYTIC CAPACITOR PACKAGE STRUCTURE HAVING A PLURALITY OF NEGATIVE LEAD PINS AND METHOD OF MANUFACTURING THE SAME", the entire contents of which are hereby incorporated by reference.

BACKGROUND OF THE INVENTION

1. Field of the Invention

The instant disclosure relates to a method of manufacturing a stacked-type solid electrolytic capacitor package structure, and more particularly to a method of manufacturing a stacked-type solid electrolytic capacitor package structure having a plurality of negative lead pins.

2. Description of Related Art

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function.

Because the solid electrolytic capacitor has the advantages of small size, large electrical capacity and good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One aspect of the instant disclosure relates to a method of manufacturing a stacked-type solid electrolytic capacitor package structure having a plurality of negative lead pins.

One of the embodiments of the instant disclosure provides a method of manufacturing a stacked-type solid electrolytic capacitor package structure having a plurality of negative lead pins, comprising: providing a plurality of stacked-type capacitors electrically connected between at least one first conductive terminal and at least one second conductive terminal, wherein each stacked-type capacitor has at least one positive portion and at least one negative portion, the at least one first conductive terminal has a first embedded portion electrically connected to the at least one positive portion of the stacked-type capacitor and a first lateral exposed portion connected to the first embedded portion, and the at least one second conductive terminal has a second embedded portion electrically connected to the at least one negative portion of the stacked-type capacitor, a second lateral exposed portion connected to the second embedded portion, a second front exposed portion connected to the second embedded portion, and a second rear exposed portion connected to the second embedded portion; forming a package body to enclose the capacitor unit, the first embedded portion of the at least one first conductive terminal and the second embedded portion of the at least one second conductive terminal, wherein the package body has a first lateral face, a second lateral face opposite to the first lateral face, a front face connected between the first lateral face and the second lateral face, a rear face connected between the first lateral face and the second lateral face and opposite to the front face, and a bottom face connected between the first lateral face, the second lateral face, the front face and the rear face, and the first lateral exposed portion, the second lateral exposed portion, the second front exposed portion and the second rear exposed portion are exposed from the package body; and then bending the first lateral exposed portion, the second lateral exposed portion, the second front exposed portion and the second rear exposed portion, wherein the first lateral exposed portion is extended along the first lateral face and the bottom surface of the package body, the second lateral exposed portion is extended along the second lateral face and the bottom face of the package body, the second front exposed portion is extended along the front face and the bottom face of the package body, and the second rear exposed portion is extended along the rear face and the bottom face of the package body.

Therefore, the stacked-type solid electrolytic capacitor package structure can be provided with a plurality of negative lead pins such as the second lateral exposed portion, the second front exposed portion and the second rear exposed portion, thus the ESL (Equivalent Series Inductance) can be effectively reduced, especially for high-frequency range.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Referring to FIG. 1 to FIG. 5, where the first embodiment of the instant disclosure provides a stacked-type solid electrolytic capacitor package structure having a plurality of negative lead pins, comprising: a capacitor unit 1, a package unit 2 and a conductive unit 3.

Figure 1:
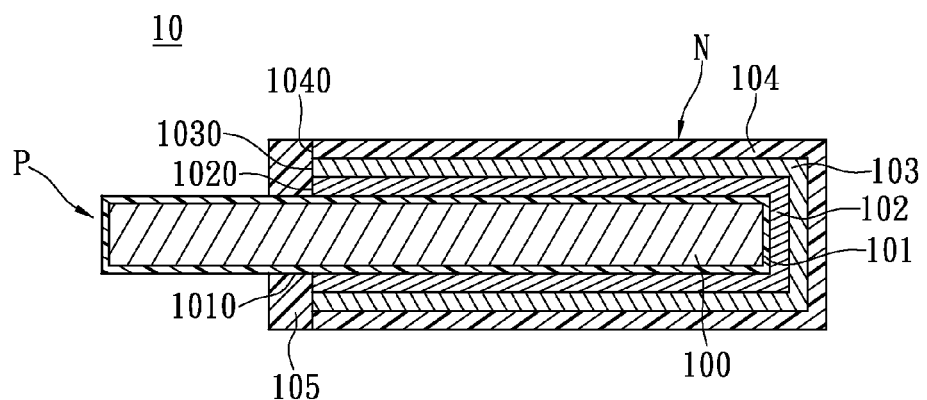
FIG. 1 shows a cross-sectional, schematic view of the capacitor unit of the stacked-type solid electrolytic capacitor package structure according to the first embodiment of the instant disclosure.

Referring to FIG. 1, the capacitor unit 1 is provided with a plurality of stacked-type capacitors 10, and each stacked-type capacitor 10 has at least one positive portion P and at least one negative portion N. For example, each stacked-type capacitor 10 includes a valve metal foil 100, an oxide insulation layer 101 enclosing the valve metal foil 100, a conductive polymer layer 102 covering one part of the oxide insulation layer 101, a carbon glue layer 103 covering the conductive polymer layer 102, and a silver glue layer 104 covering the carbon glue layer 103. In addition, each stacked-type capacitor 10 has a surrounding insulating layer 105 disposed on the outer surface of the oxide insulation layer 101 and around the outer surface of the oxide insulation layer 101, and the lengths of the conductive polymer layer 102, the carbon glue layer 103 and the silver glue layer 104 of each stacked-type capacitor 10 are limited by each corresponding surrounding insulating layer 105. For more precisely, the oxide insulation layer 101 has a surrounding region 1010 on the outer surface thereof, and the surrounding insulating layer 105 of each stacked-type capacitor 10 is surroundingly disposed on the surrounding region 1010 of each corresponding oxide insulation layer 101 and contacting an end 1020 of each corresponding conductive polymer layer 102, an end 1030 of each corresponding carbon glue layer 103 and an end 1040 of each corresponding silver glue layer 104. However, the above-mentioned design for the stacked-type capacitor 10 of the first embodiment is merely an example and is not meant to limit the instant disclosure.

Figure 2:
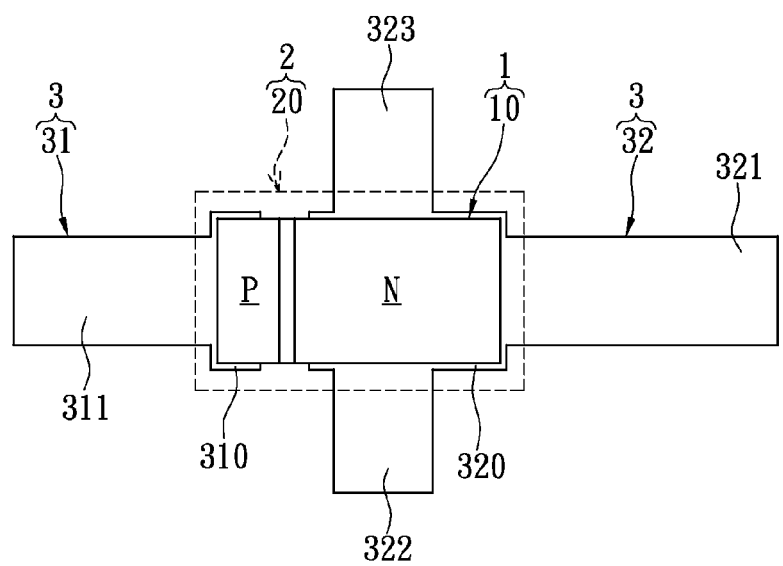
FIG. 2 shows a top, schematic view of the first conductive terminal and the second conductive terminal that have not been bent, according to the first embodiment of the instant disclosure.
Figure 3A:
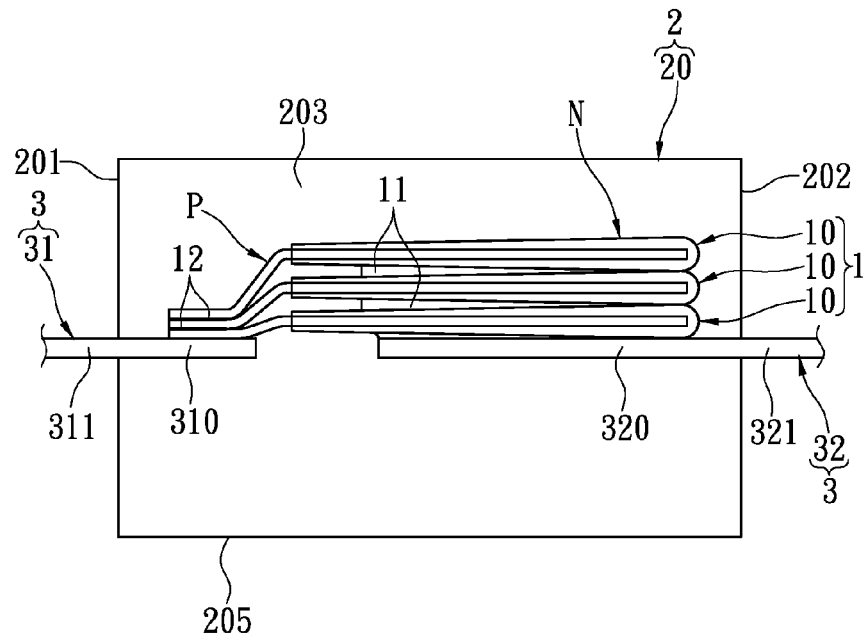
FIG. 3A shows a lateral, schematic view of the first conductive terminal and the second conductive terminal that have not been bent, according to the first embodiment of the instant disclosure.
Figure 3B:
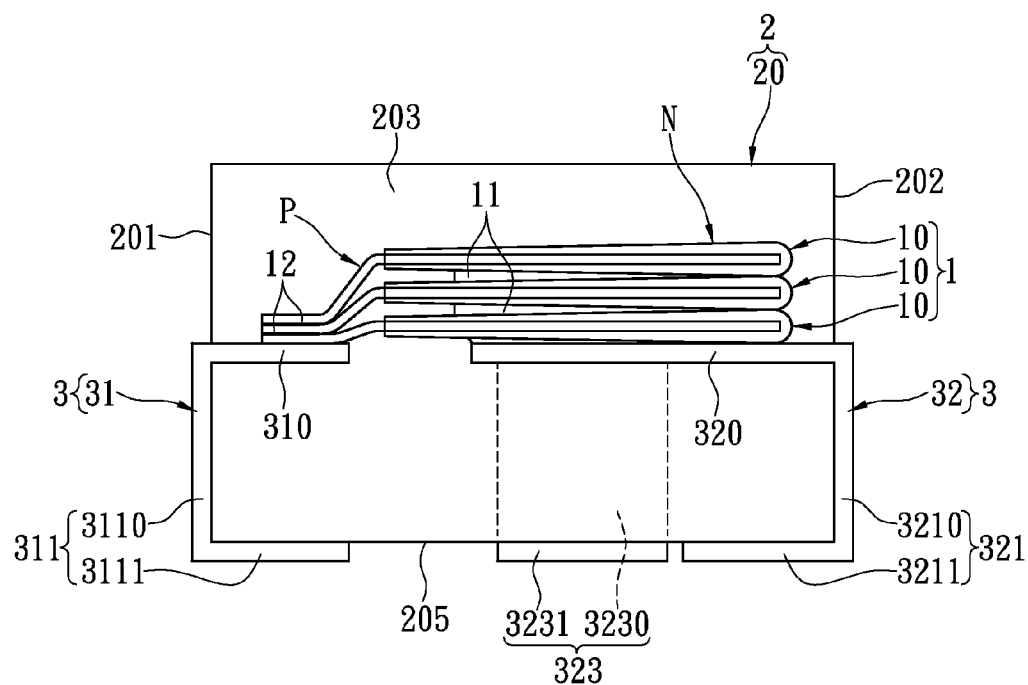
FIG. 3B shows a lateral, schematic view of the first conductive terminal and the second conductive terminal that have been bent, according to the first embodiment of the instant disclosure.
Figure 4A:
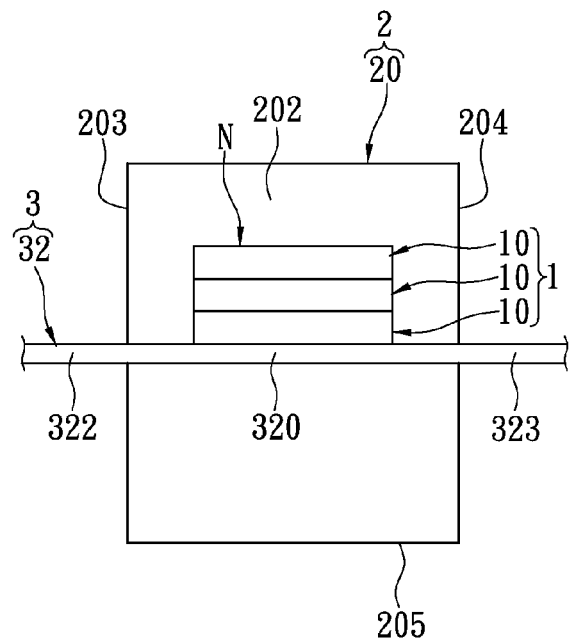
FIG. 4A shows another lateral, schematic view of the first conductive terminal and the second conductive terminal that have not been bent, according to the first embodiment of the instant disclosure.
Figure 4B:
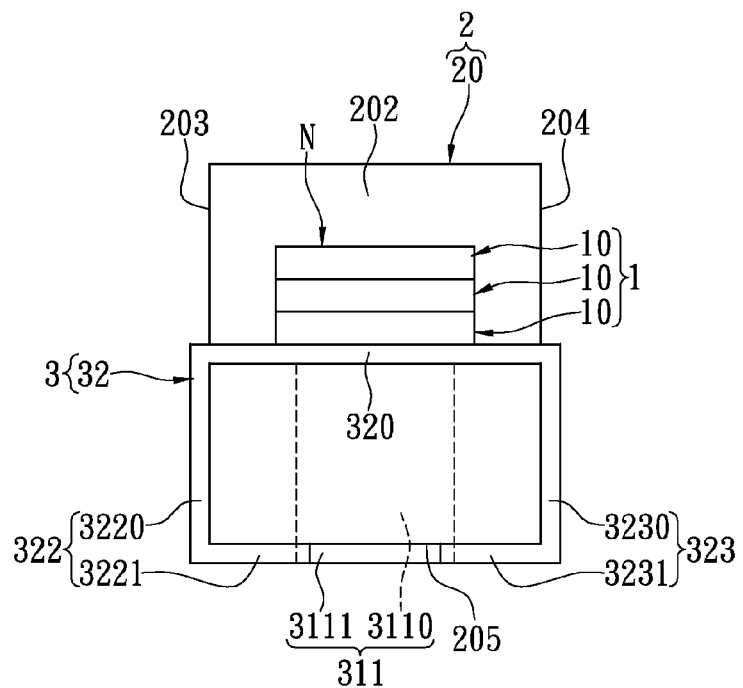
FIG. 4B shows another lateral, schematic view of the first conductive terminal and the second conductive terminal that have been bent, according to the first embodiment of the instant disclosure.
Figure 5:
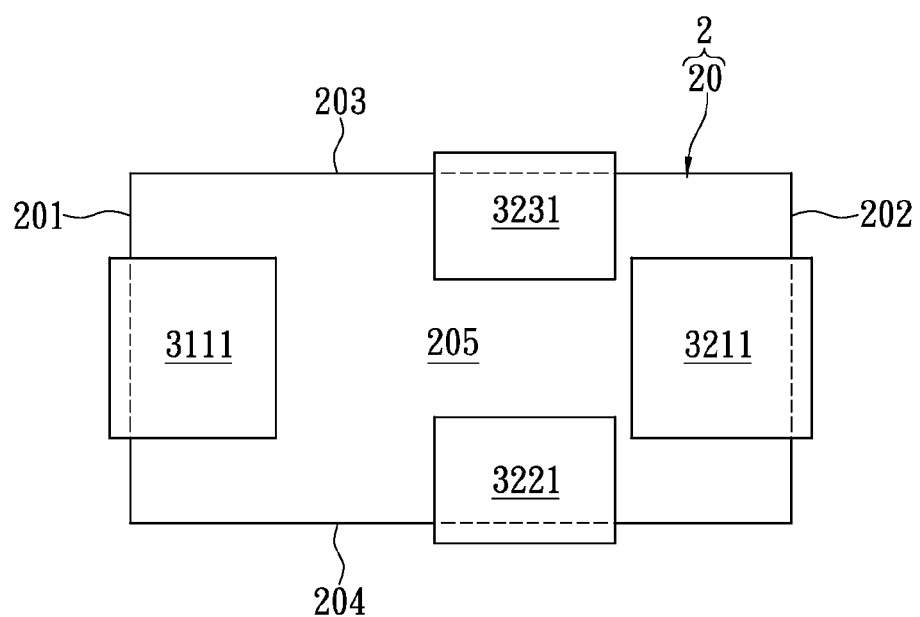
FIG. 5 shows a bottom, schematic view of the first conductive terminal and the second conductive terminal that have been bent, according to the first embodiment of the instant disclosure.
Figure 6:
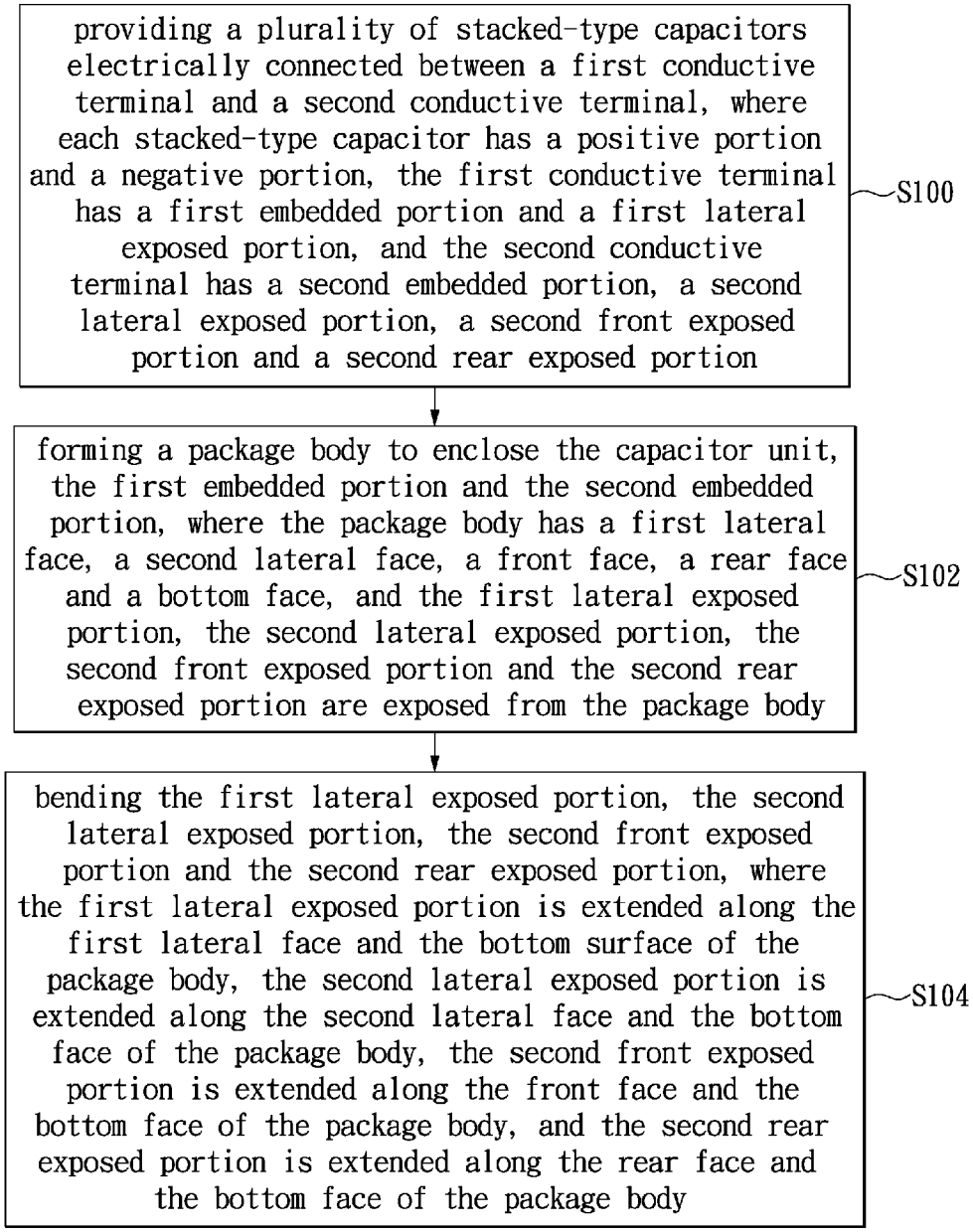
FIG. 6 shows a flowchart of the method of manufacturing a stacked-type solid electrolytic capacitor package structure according to the first embodiment of the instant disclosure.

Referring to FIG. 2 to FIG. 5, where FIG. 2 shows a top, schematic diagram before bending the first conductive terminal and the second conductive terminal, FIG. 3A shows a lateral, schematic diagram before bending the first conductive terminal and the second conductive terminal, FIG. 3B shows a lateral, schematic diagram after bending the first conductive terminal and the second conductive terminal, FIG. 4A shows another lateral, schematic diagram before bending the first conductive terminal and the second conductive terminal, FIG. 4B shows another lateral, schematic diagram after bending the first conductive terminal and the second conductive terminal, and FIG. 5 shows a bottom, schematic diagram after bending the first conductive terminal and the second conductive terminal.

First, the capacitor unit 1 includes a plurality of stacked-type capacitors 10 stacked on top of one another and electrically connected with each other, where the two negative portions N of the two adjacent stacked-type capacitors 10 are stacked on top of one another by conductive glue 11, and the two positive portions P of the two adjacent stacked-type capacitors 10 are stacked on top of one another by a soldering layer 12 (as shown in FIG. 3A and FIG. 3B). In addition, the package unit 2 includes a package body 20 enclosing the capacitor unit 1, where the package body 20 has a first lateral face 201, a second lateral face 202 opposite to the first lateral face 201, a front face 203 connected between the first lateral face 201 and the second lateral face 202, a rear face 204 connected between the first lateral face 201 and the second lateral face 202 and opposite to the front face 203, and a bottom face 205 connected between the first lateral face 201, the second lateral face 202, the front face 203 and the rear face 204.

Moreover, the conductive unit 3 includes at least one first conductive terminal 31 and at least one second conductive terminal 32 separated from each other. The at least one first conductive terminal 31 has a first embedded portion 310 electrically connected to the at least one positive portion P of the stacked-type capacitor 10 and enclosed by the package body 20 and a first lateral exposed portion 311 connected to the first embedded portion 310, and the first lateral exposed portion 311 is exposed from the package body 20 and extended along the first lateral face 201 and the bottom surface 205 of the package body 20. The at least one second conductive terminal 32 has a second embedded portion 320 electrically connected to the at least one negative portion N of the stacked-type capacitor 10 and enclosed by the package body 20, a second lateral exposed portion 321 connected to the second embedded portion 320, a second front exposed portion 322 connected to the second embedded portion 320, and a second rear exposed portion 323 connected to the second embedded portion 320. In addition, the second lateral exposed portion 321 is exposed from the package body 20 and extended along the second lateral face 202 and the bottom face 205 of the package body 20, the second front exposed portion 322 is exposed from the package body 20 and extended along the front face 203 and the bottom face 205 of the package body 20, and the second rear exposed portion 323 is exposed from the package body 20 and extended along the rear face 204 and the bottom face 205 of the package body 20.

For example, referring to FIG. 3B, the first lateral exposed portion 311 has a first lateral extending section 3110 bent downwardly from the first embedded portion 310 and extended along the first lateral face 201 of the package body 20 and a first lateral soldering section 3111 bent inwardly from the first lateral extending section 3110 and extended along the bottom face 205 of the package body 20, and the second lateral exposed portion 321 has a second lateral extending section 3210 bent downwardly from the second embedded portion 320 and extended along the second lateral face 202 of the package body 20 and a second lateral soldering section 3211 bent inwardly from the second lateral extending section 3210 and extended along the bottom face 205 of the package body 20. Referring to FIG. 4B, the second front exposed portion 322 has a second front extending section 3220 bent downwardly from the second embedded portion 320 and extended along the second front face 203 of the package body 20 and a second front soldering section 3221 bent inwardly from the second front extending section 3220 and extended along the bottom face 205 of the package body 20, and the second rear exposed portion 323 has a second rear extending section 3230 bent downwardly from the second embedded portion 320 and extended along the second rear face 204 of the package body 20 and a second rear soldering section 3231 bent inwardly from the second rear extending section 3230 and extended along the bottom face 205 of the package body 20. Furthermore, referring to FIG. 5, the second front soldering section 3221 and the second rear soldering section 3231 are disposed between the first lateral soldering section 3111 and the second lateral soldering section 3211, and the second front soldering section 3221 and the second rear soldering section 3231 are far away from the first lateral soldering section 3111 and adjacent to the second lateral soldering section 3211. Because the second lateral soldering section 3211, the second front soldering section 3221 and the second rear soldering section 3231 are used as three negative electrode pads, the total contact area of the negative electrode pads can be increased.

For more precisely, the first embodiment of the instant disclosure provides a method of manufacturing a stacked-type solid electrolytic capacitor package structure having a plurality of negative lead pins, comprising:

The step S100 is that: referring to FIG. 1 and FIG. 2, providing a plurality of stacked-type capacitors 10 electrically connected between at least one first conductive terminal 31 and at least one second conductive terminal 32, where each stacked-type capacitor 10 has at least one positive portion P and at least one negative portion N, the at least one first conductive terminal 31 has a first embedded portion 310 electrically connected to the at least one positive portion P of the stacked-type capacitor 10 and a first lateral exposed portion 311 connected to the first embedded portion 310, and the at least one second conductive terminal 32 has a second embedded portion 320 electrically connected to the at least one negative portion N of the stacked-type capacitor 10, a second lateral exposed portion 321 connected to the second embedded portion 320, a second front exposed portion 322 connected to the second embedded portion 320, and a second rear exposed portion 323 connected to the second embedded portion 320.

The step S102 is that: referring to FIGS. 2, 3A and 4A, forming a package body 20 to enclose the capacitor unit 1, the first embedded portion 310 of the at least one first conductive terminal 31 and the second embedded portion 320 of the at least one second conductive terminal 32, where the package body 20 has a first lateral face 201, a second lateral face 202 opposite to the first lateral face 201, a front face 203 connected between the first lateral face 201 and the second lateral face 202, a rear face 204 connected between the first lateral face 201 and the second lateral face 202 and opposite to the front face 203, and a bottom face 205 connected between the first lateral face 201, the second lateral face 202, the front face 203 and the rear face 204, and the first lateral exposed portion 311, the second lateral exposed portion 321, the second front exposed portion 322 and the second rear exposed portion 323 are exposed from the package body 20.

The step S104 is that: referring to FIGS. 3B, 4B and 5, bending the first lateral exposed portion 311, the second lateral exposed portion 321, the second front exposed portion 322 and the second rear exposed portion 323, where the first lateral exposed portion 311 is extended along the first lateral face 201 and the bottom surface 205 of the package body 20, the second lateral exposed portion 321 is extended along the second lateral face 202 and the bottom face 205 of the package body 20, the second front exposed portion 322 is extended along the front face 203 and the bottom face 205 of the package body 20, and the second rear exposed portion 323 is extended along the rear face 204 and the bottom face 205 of the package body 20.

Second Embodiment

Figure 7:
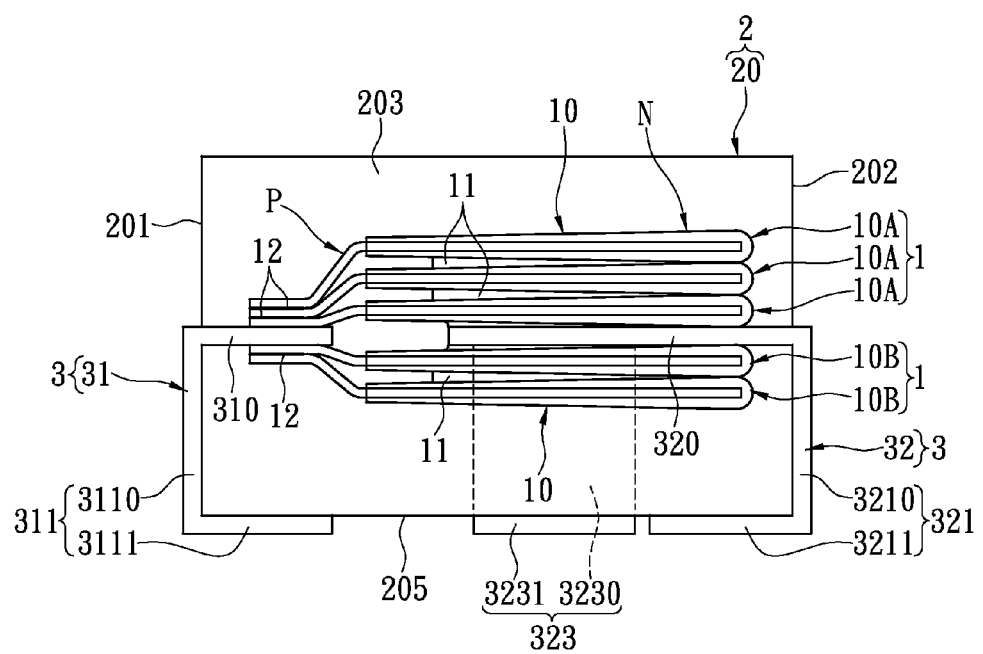
FIG. 7 shows a lateral, schematic view of the first conductive terminal and the second conductive terminal that have been bent, according to the second embodiment of the instant disclosure.

Referring to FIG. 7, where the second embodiment of the instant disclosure provides a stacked-type solid electrolytic capacitor package structure having a plurality of negative lead pins, comprising: a capacitor unit 1, a package unit 2 and a conductive unit 3. Comparing FIG. 7 with FIG. 3B, the difference between the second embodiment and the first embodiment is as follows: in the second embodiment, the capacitor unit 1 includes a plurality of first stacked-type capacitors 10A and a plurality of second stacked-type capacitors 10B, where the first stacked-type capacitors 10A are stacked on top of one another and disposed on the top side of the second embedded portion 320, and the second stacked-type capacitors 10B are stacked on top of one another and disposed on the bottom side of the second embedded portion 320. For example, the two negative portions N of the two adjacent stacked-type capacitors 10 (such as two adjacent first stacked-type capacitors 10A or two adjacent second stacked-type capacitors 10B) are stacked on top of one another by conductive glue 11, and the two positive portions P of the two adjacent stacked-type capacitors 10 (such as two adjacent first stacked-type capacitors 10A or two adjacent second stacked-type capacitors 10B) are stacked on top of one another by a soldering layer 12.

For example, when the first stacked-type capacitors 10A and the second stacked-type capacitors 10B are disposed on the top side of the second embedded portion 320 of the at least one second conductive terminal 32, the first stacked-type capacitors 10A and the second stacked-type capacitors 10B are alternately stacked on top of one another. In addition, each first stacked-type capacitor 10A includes a first positive portion P electrically connected to the first conductive terminal 31 and a first negative portion N electrically connected to the second conductive terminal 32, the first positive portion P has a first positive pin extended outwardly along a first predetermined direction, and the first positive pins of the first positive portions P are alternately stacked on top of one another. Each second stacked-type capacitor 10B includes a second positive portion P electrically connected to the first conductive terminal 31 and a second negative portion N electrically connected to the second conductive terminal 32, the second positive portion P has a second positive pin extended outwardly along a second predetermined direction, the second positive pins of the second positive portions P are alternately stacked on top of one another and separated from the first positive pins of the first positive portions P, and the first predetermined direction and the second predetermined direction are different direction. For one embodiment, the first negative portion N has a first negative pin extended outwardly along a third predetermined direction, the first negative pins of the first negative portions N are alternately stacked on top of one another, the second negative portion N has a second negative pin extended outwardly along a fourth predetermined direction, the second negative pins of the second negative portions N are alternately stacked on top of one another and separated from the first negative pins of the first negative portions N, and the third predetermined direction and the fourth predetermined direction are different direction. For another embodiment, the first negative portion N has a first negative pin extended outwardly along a third predetermined direction, the second negative portion N has a second negative pin extended outwardly along a fourth predetermined direction, the third predetermined direction and the fourth predetermined direction are the same direction, and the first negative pins and the second negative pins of the second negative portions N are alternately stacked on top of one another.

In conclusion, the stacked-type solid electrolytic capacitor package structure can be provided with a plurality of negative lead pins such as the second lateral exposed portion, the second front exposed portion and the second rear exposed portion, thus the ESL (Equivalent Series Inductance) can be effectively reduced, especially for high-frequency range. Comparing the prior art with the instant disclosure, the stacked-type solid electrolytic capacitor package structure having two exposed soldering sections (i.e., a two-pin structure) according to the prior art and the stacked-type solid electrolytic capacitor package structure having four exposed soldering sections (i.e., a four-pin structure such as the first lateral soldering section 3111, the second lateral soldering section 3211, the second front soldering section 3221 and the second rear soldering section 3231) according to the instant disclosure are measured at different frequencies (KHz) to obtain different ESL values (nH), as shown in the following table:

| Frequency (KHz) | Two-pin structure ESL value (nH) | Four-pin structure ESL value (nH) |
| --- | --- | --- |
| 100 | −9.15 | −12.50 |
| 200 | −6.85 | −9.30 |
| 300 | −3.48 | −5.35 |
| 400 | −0.77 | −2.23 |
| 500 | 0.88 | −1.09 |
| 600 | 0.66 | −0.36 |
| 700 | 0.98 | 0.06 |
| 800 | 1.06 | 0.26 |
| 900 | 1.22 | 0.43 |
| 1000 | 1.23 | 0.46 |

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A method of manufacturing a stacked-type solid electrolytic capacitor package structure having a plurality of negative lead pins, comprising:

providing a plurality of stacked-type capacitors electrically connected between at least one first conductive terminal and at least one second conductive terminal, wherein each stacked-type capacitor has at least one positive portion and at least one negative portion, the at least one first conductive terminal has a first embedded portion electrically connected to the at least one positive portion of the stacked-type capacitor and a first lateral exposed portion connected to the first embedded portion, and the at least one second conductive terminal has a second embedded portion electrically connected to the at least one negative portion of the stacked-type capacitor, a second lateral exposed portion connected to the second embedded portion, a second front exposed portion connected to the second embedded portion, and a second rear exposed portion connected to the second embedded portion;

forming a package body to enclose the capacitor unit, the first embedded portion of the at least one first conductive terminal and the second embedded portion of the at least one second conductive terminal, wherein the package body has a first lateral face, a second lateral face opposite to the first lateral face, a front face connected between the first lateral face and the second lateral face, a rear face connected between the first lateral face and the second lateral face and opposite to the front face, and a bottom face connected between the first lateral face, the second lateral face, the front face and the rear face, and the first lateral exposed portion, the second lateral exposed portion, the second front exposed portion and the second rear exposed portion are exposed from the package body; and bending the first lateral exposed portion, the second lateral exposed portion, the second front exposed portion and the second rear exposed portion, wherein the first lateral exposed portion is extended along the first lateral face and the bottom surface of the package body, the second lateral exposed portion is extended along the second lateral face and the bottom face of the package body, the second front exposed portion is extended along the front face and the bottom face of the package body, and the second rear exposed portion is extended along the rear face and the bottom face of the package body.

2. The method of claim 1, wherein the first lateral exposed portion has a first lateral extending section bent downwardly from the first embedded portion and extended along the first lateral face of the package body and a first lateral soldering section bent inwardly from the first lateral extending section and extended along the bottom face of the package body, the second lateral exposed portion has a second lateral extending section bent downwardly from the second embedded portion and extended along the second lateral face of the package body and a second lateral soldering section bent inwardly from the second lateral extending section and extended along the bottom face of the package body, the second front exposed portion has a second front extending section bent downwardly from the second embedded portion and extended along the second front face of the package body and a second front soldering section bent inwardly from the second front extending section and extended along the bottom face of the package body, and the second rear exposed portion has a second rear extending section bent downwardly from the second embedded portion and extended along the second rear face of the package body and a second rear soldering section bent inwardly from the second rear extending section and extended along the bottom face of the package body.

3. The method of claim 2, wherein the second front soldering section and the second rear soldering section are disposed between the first lateral soldering section and the second lateral soldering section, and the second front soldering section and the second rear soldering section are far away from the first lateral soldering section and adjacent to the second lateral soldering section.

4. The method of claim 1, wherein each stacked-type capacitor includes a valve metal foil, an oxide insulation layer enclosing the valve metal foil, a conductive polymer layer covering one part of the oxide insulation layer, a carbon glue layer covering the conductive polymer layer, and a silver glue layer covering the carbon glue layer, wherein the two negative portions of the two adjacent stacked-type capacitors are stacked on top of one another by conductive glue, and the two positive portions of the two adjacent stacked-type capacitors are stacked on top of one another by a soldering layer, wherein each stacked-type capacitor has a surrounding insulating layer disposed on the outer surface of the oxide insulation layer and around the outer surface of the oxide insulation layer, and the lengths of the conductive polymer layer, the carbon glue layer and the silver glue layer of each stacked-type capacitor are limited by each corresponding surrounding insulating layer, wherein the oxide insulation layer has a surrounding region on the outer surface thereof, and the surrounding insulating layer of each stacked-type capacitor is surroundingly disposed on the surrounding region of each corresponding oxide insulation layer and contacting an end of each corresponding conductive polymer layer, an end of each corresponding carbon glue layer and an end of each corresponding silver glue layer.

5. The method of claim 1, wherein the stacked-type solid electrolytic capacitor package structure has an equivalent series inductance substantially between $-12.5$ nH at 100 KHz and 0.46 nH at 1000 KHz.

\* \* \* \* \*